United States Patent
Imboden et al.

(10) Patent No.: US 12,088,133 B2
(45) Date of Patent: Sep. 10, 2024

(54) POWER MANAGEMENT METHOD FOR A SOLAR WATCH

(71) Applicant: The Swatch Group Research and Development Ltd, Marin (CH)

(72) Inventors: Matthias Imboden, St-Blaise (CH); Jean-Jacques Born, Morges (CH); Alexandre Haemmerli, Neuchâtel (CH); Lionel Paratte, Marin-Epagnier (CH); Christophe Germiquet, Prêles (CH); François Gueissaz, Cormondrèche (CH); Michel Willemin, Prêles (CH)

(73) Assignee: The Swatch Group Research and Development Ltd, Marin (CH)

( * ) Notice: Subject to any disclaimer, the term of this patent is extended or adjusted under 35 U.S.C. 154(b) by 257 days.

(21) Appl. No.: 17/518,002

(22) Filed: Nov. 3, 2021

(65) Prior Publication Data
US 2022/0209558 A1 Jun. 30, 2022

(30) Foreign Application Priority Data

Dec. 29, 2020 (EP) .................................. 20217683

(51) Int. Cl.
*H02J 7/00* (2006.01)
*G04C 10/02* (2006.01)
(Continued)

(52) U.S. Cl.
CPC ............ *H02J 7/0063* (2013.01); *G04C 10/02* (2013.01); *H02J 7/345* (2013.01); *H02P 8/02* (2013.01); *H02S 99/00* (2013.01)

(58) Field of Classification Search
CPC ........ H02J 7/0063; H02J 7/345; G04C 10/02; H02S 99/00; H02P 8/02
(Continued)

(56) References Cited

U.S. PATENT DOCUMENTS 4,901,295 A * 2/1990 Taguezout ............. G04C 10/02
368/149
6,462,967 B1 10/2002 Fujisawa et al.
(Continued)

FOREIGN PATENT DOCUMENTS

CN 105607461 A 5/2016
CN 111525671 A 8/2020
(Continued)

OTHER PUBLICATIONS

European Search Report issued Jun. 8, 2021 in European Application 20217683.0, filed on Dec. 29, 2020, 2 pages.
(Continued)

*Primary Examiner* — Kawing Chan
(74) *Attorney, Agent, or Firm* — Oblon, McClelland, Maier & Neustadt, L.L.P.

(57) ABSTRACT

A power management method for a solar watch or a solar automatic watch. The power management method including at least one providing a primary power supply from at least one energy supplier. The primary power supply is converted to a secondary power supply when the primary power supply reaches at least one primary threshold and/or at least one secondary threshold. A motor is supplied with the secondary power supply such as to wind a mainspring via the motor.

6 Claims, 5 Drawing Sheets

(51) Int. Cl.
    *H02J 7/34*         (2006.01)
    *H02P 8/02*         (2006.01)
    *H02S 99/00*      (2014.01)

(58) Field of Classification Search
    USPC .......................................................... 318/3
    See application file for complete search history.

(56) References Cited

U.S. PATENT DOCUMENTS

| | | |
|---|---|---|
| 2012/0057435 A1 | 3/2012 | Honmura. et al. |
| 2012/0057436 A1 | 3/2012 | Sakumoto et al. |

FOREIGN PATENT DOCUMENTS

| | | |
|---|---|---|
| DE | 10 2016 211 503 B3 | 11/2017 |
| JP | 1-197690 A | 8/1989 |
| JP | 2004-212405 A | 7/2004 |
| JP | 2019-86329 A | 6/2019 |
| WO | WO 2011/092405 A1 | 8/2011 |

OTHER PUBLICATIONS

Japanese Office Action issued Jan. 10, 2023 in Japanese Patent Application No. 2021-188347 (with English Translation), 8 pages.
Chinese Office Action dated Jun. 14, 2024, issued in Chinese Patent Application No. 202111630684.X (with English translation).
Ke-ya HUANG et al. "Design of Charge Controller for Solar LED Lighting Systemn." Electric Drive, 2012, vol. 42. No. 11.
Zhu Zhou et al. "Designing High-Effiency Solar Charging Management System." Electronic Measurement Technology, 2019. vol. 38, No. 9.

\* cited by examiner

POWER MANAGEMENT METHOD FOR A SOLAR WATCH

CROSS-REFERENCE TO RELATED APPLICATION

This application claims priority to European Patent Application No. 20217683.0 filed on Dec. 29, 2020, the entire disclosure of which is hereby incorporated herein by reference.

TECHNICAL FIELD

The present invention relates to power management method. In particular, the present invention concerns an electric winder for a manual or self-winding watch, the winder including an electric motor, an accumulator arranged to power the motor, a solar cell arranged to charge the accumulator, an internal clock and an electronic means of controlling the motor and implementing said power management method.

STATE OF THE ART

For over one hundred years, manual or automatic watches have enabled a mechanical watch to remain wound, and run perpetually, during normal use. The required energy is harvested from either the manual winding using the crown, for example or the mechanical motion resulting from the natural movements of the user. However, once stationary the mainspring will slowly drain all the mechanically stored energy into the watch movement and after typically 48 to 80 h the watch will stop.

SUMMARY OF THE INVENTION

The present invention relates to a power management method for a solar watch or a solar automatic watch; said power management method comprising:
  Providing a primary power supply from at least one energy supplier;
  Converting said primary power supply to a secondary power supply when said primary power supply reaches at least one primary threshold and/or at least one secondary threshold;
  Supplying a motor with said secondary power supply; and,
  Winding a mainspring via said motor.

Thanks to this arrangement, said motor, preferably said stepper motor, driven by solar energy, may wind the mainspring of a classical mechanical watch and may operate at its maximum efficiency even in low light conditions. Further, given sufficient ambient light, the mechanical watch will remain mechanically charged even when not in active use. Such a Solar-Automatic mechanism can operate on light power alone, or combine solar and mechanical energy harvesting methods to remain optimally charged for all user conditions.

According to an embodiment, said at least one energy supplier comprises at least one solar cell and/or at least one capacitor.

According to an embodiment, said at least one energy supplier is supplied by light.

Thanks to one of those arrangements, said solar watch is supplied via sunlight, ambient light and/or stored energy by said at least one capacitor.

According to an embodiment, said at least one energy supplier is partially charged or discharged when said primary power supply reaches said at least one secondary threshold, preferably said at least one capacitor is partially charged or discharged when said primary power supply reaches said at least one secondary threshold.

Thanks to this arrangement, the motor is driven only if sufficient energy is available for efficient operation.

According to an embodiment, said power management method comprises a stop of converting said primary power supply to said secondary power supply when said primary power supply reaches said at least one primary threshold, preferably when said primary power supply is lower than said at least one primary threshold.

Thanks to this arrangement, the stored power is isolated from the motor if insufficient voltage remains for efficient operation.

According to an embodiment, said secondary power supply is a secondary square wave; said secondary square wave comprises at least one voltage amplitude, at least one duty cycle and/or period.

According to an embodiment, said power management method comprises at least one chopping of said secondary power supply into a modulated signal having at least one secondary duration.

According to an embodiment, said modulated signal is transformed into at least one first secondary square wave and one second secondary square wave; said at least one first secondary square wave and said one second secondary square wave are inversed with respect to each other.

According to an embodiment, said modulated signal is equal to said at least one first secondary square wave or said at least one second secondary square wave.

Thanks to one of those arrangements, the energy available is transformed into at least one waveform that can efficiently drive a motor.

According to an embodiment, said secondary square wave comprises said primary duration is a function of the energy stored in said at least one capacitor, the energy consumption and the energy delivered by solar cell; said at least one secondary duration is determined by said at least one primary threshold and said at least one secondary threshold.

Thanks to one of those arrangements, the energy available is transformed into at least one waveform that can efficiently drive a motor.

According to an embodiment, said primary duration is longer than said at least one secondary duration, preferably said primary duration is at least ten times longer than said at least one secondary duration.

According to an embodiment, said at least one secondary duration is determined to maximize the motor's efficiency.

Thanks to one of those arrangements, it limits the start-stop events, which waste energy.

According to an embodiment, said power management method comprises a delaying configured to delay in supplying said motor with said secondary power supply.

Thanks to this arrangement, it prevents loss of efficiency by insuring the chopped signal is established before energy is supplied to the motor. The present invention relates to a solar watch configured to implement power management method according to an aspect of the invention and comprising a mainspring, a motor configured to wind said mainspring and at least one solar cell configured to supply a primary power supply to said motor.

Thanks to this arrangement, said motor, preferably said stepper motor, driven by solar energy, may wind the mainspring of a classical manual winding mechanical watch and may operate at its maximum efficiency even in low light conditions. Further, given sufficient ambient light, the mechanical watch will remain mechanically charged even when not in active use. Such a mechanism can operate on light power alone, or combine solar and mechanical manual winding energy harvesting methods to remain optimally charged for all user conditions.

The present invention relates to a solar automatic watch configured to implement power management method according to an aspect of the invention and comprising a mainspring, an oscillating weight configured to wind said mainspring, a motor configured to wind said mainspring and at least one solar cell configured to supply a primary power supply to said motor.

Thanks to this arrangement, said motor, preferably said stepper motor, driven by solar energy, may wind the mainspring of a classical mechanical watch and may operate at its maximum efficiency even in low light conditions. Further, given sufficient ambient light, the mechanical watch will remain mechanically charged even when not in active use. Such an automatic mechanism can operate on light power alone, or combine solar and mechanical energy harvesting methods to remain optimally charged for all user conditions.

BRIEF DESCRIPTION OF THE DRAWINGS

The foregoing and other purposes, features, aspects, and advantages of the invention will become apparent from the following detailed description of the embodiments, given by way of illustration and not limitation with reference to the accompanying drawings, in which:

FIGS. 7A-10B illustrate said secondary power supply 120, at least one first secondary square wave 126 and at least one second secondary square wave 127.

DESCRIPTION OF THE INVENTION

Electric watch winders are already known. These winders are devices, which may be used to prevent a self-winding watch from stopping when it is not worn for a certain period of time. Self-winding watches are fitted with a mechanism, which automatically winds the mainspring using the arm movements of the person wearing the watch as the drive force. When a self-winding watch is worn, the movements cause an oscillating weight provided for this purpose to rotate or oscillate inside the watch. The oscillating weight is in turn arranged to transmit the energy, which moves it to a gear train, which winds the mainspring or barrel spring. It will thus be clear that a self-winding watch, which remains immobile is not wound.

One place where a watch is especially likely to remain immobile for a long time is in a store window for instance. Indeed, it is not unusual for a large number of watches to be statically displayed in watch store window displays for example. The use of an internal electric winding mechanism is thus particularly advantageous in this environment. However, said motor, preferably said stepper motor, draws more power when optimally driven than typical low or medium light conditions can supply using standard solar cells. Therefore, the present invention proposes a power management method 500 for a solar watch 200 or a solar automatic watch 200, wherein said motor, preferably said stepper motor, may wind the mainspring of a classical mechanical watch and may operate at its maximum efficiency even in low light conditions, and a solar watch 200 or a solar automatic watch 200 configured to implement said power management method 500 according to an aspect of the invention. An advantage of said solar watch 200 or said solar automatic watch 200 is to have a manual watch movement or an automatic watch movement respectively which can be winded even when is not manually winded or worn for a certain period of time.

Further, given sufficient ambient light, the mechanical watch will remain mechanically charged even when not in active use. Such a Solar-Automatic mechanism can operate on light power alone, or combine solar and mechanical energy harvesting methods to remain optimally charged for all user conditions.

Figure 1A:
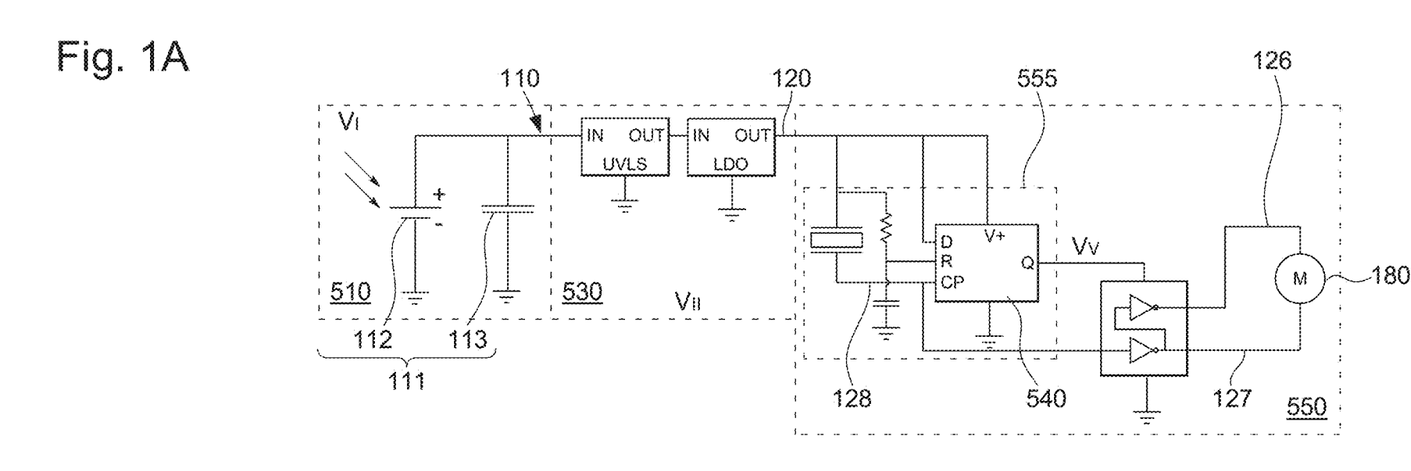
FIGS. 1A, 1B, and 1C represent an electrical circuit for a solar watch 200 or a solar automatic watch 200 according to an embodiment of the invention.
Figure 1B:
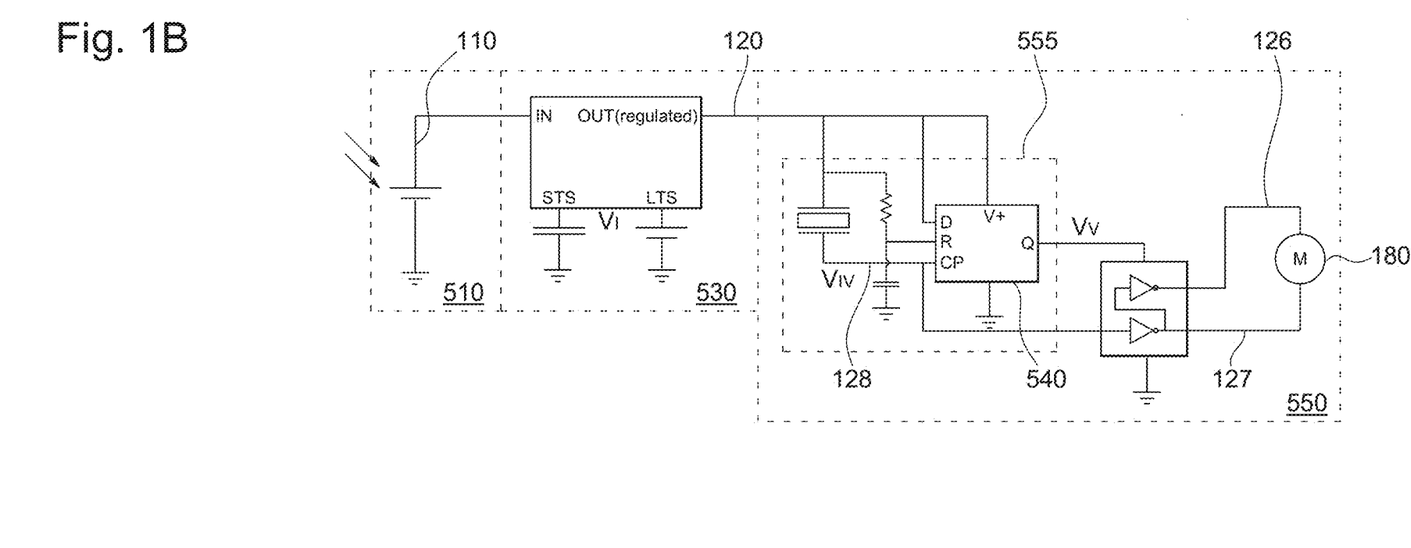
Figure 1C:
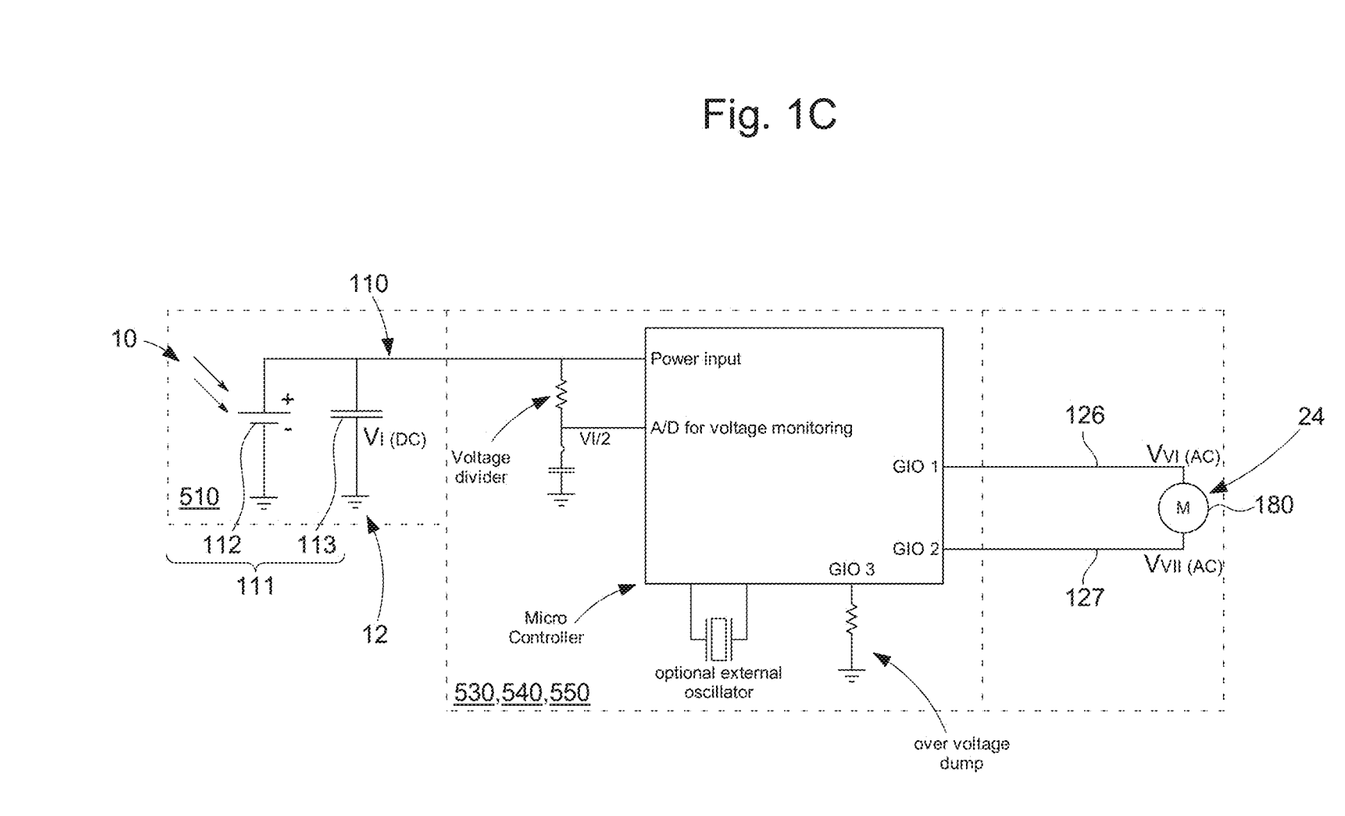
Figure 2:
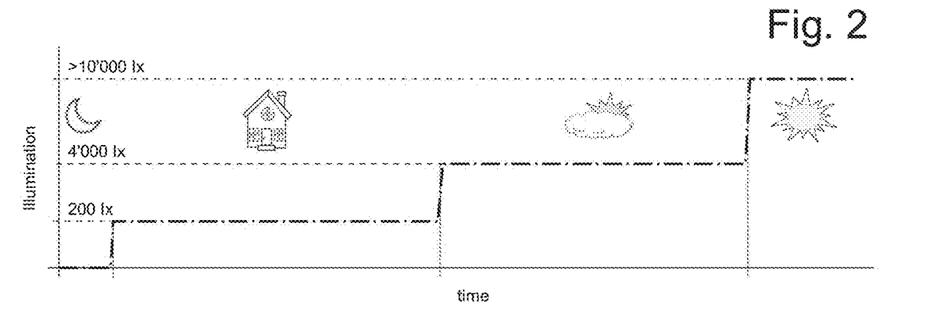
FIG. 2 represents different light conditions for said solar watch 200 or said solar automatic watch 200 according to an embodiment of the invention.
Figure 3:
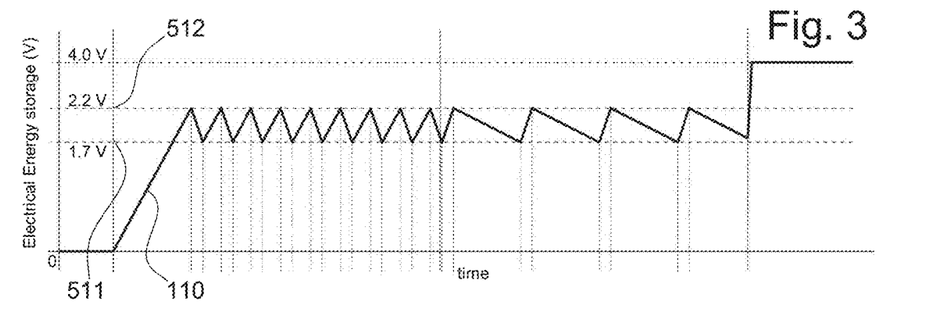
FIG. 3 represents a power management method 500 according to an embodiment of the invention.
Figure 4:
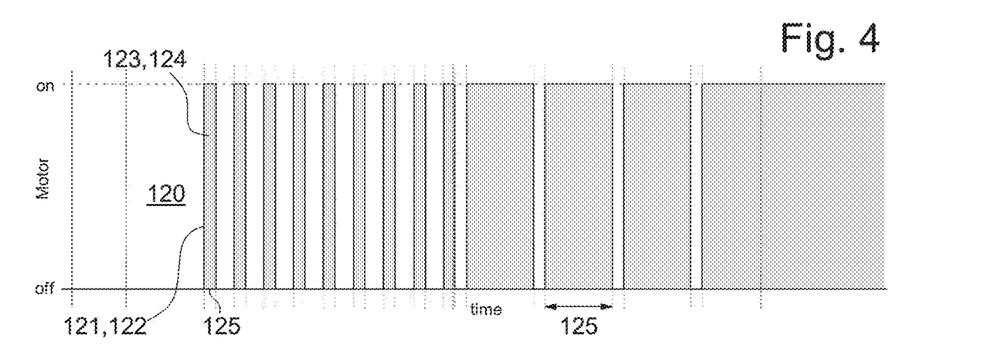
FIG. 4 represents a motor 180 supplied with said secondary power supply 120 according to an embodiment of the invention.
Figure 5:
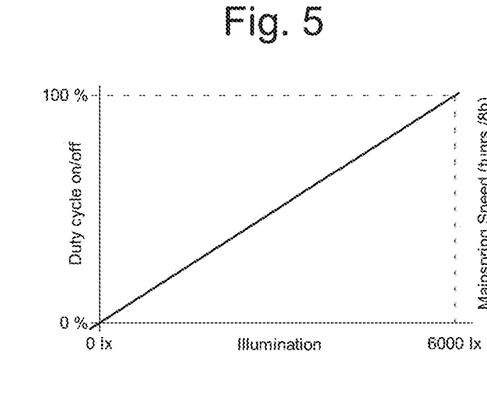
FIGS. 5 and 6 represent duty cycle and mainspring speed respectively as a function of illumination.

Therefore, said power management method 500 may provide 510 a primary power supply 110 from at least one energy supplier 111, which comprises at least one solar cell 112 and at least one capacitor 113 as depicted in FIGS. 1A-1C. Indeed, said solar watch 200 is supplied by sunlight and/or ambient light via said at least one solar cell 112. A portion of energy harvested via said at least one solar cell 112 may be stored by said at least one capacitor 113, which may supply, in turn, said solar watch 200 as said primary power supply 110, and another portion of energy harvested via said at least one solar cell 112 may directly supply said solar watch 200 as said primary power supply 110.

Said primary power supply 110 may be converted 530 to a secondary power supply 120, which may be a secondary square voltage wave 121 having a voltage amplitude and a duty cycle and a period, when said primary power supply 110 reaches at least one threshold, preferably a second voltage threshold 512, until the primary power supply 110 reaches a first voltage threshold 511 lower than the second voltage threshold 512. Said voltage amplitude of said secondary square voltage wave 121 may be equal to a third voltage threshold 5132, located between the first voltage threshold 511 and the second voltage threshold 512, when the primary power supply 110 is higher than this third voltage threshold, as depicted in FIGS. 7A-10B.

Said secondary square voltage wave 121, aforementioned, may have at least one primary duration 125 being a function of the energy stored in said at least one capacitor 113, the energy consumption and the energy delivered by said at least one solar cell, and may be determined by said first voltage threshold 511 and said second voltage threshold 512, such as the energy available may be transformed into at least one waveform that can efficiently drive said motor 180. For example, a Lavet stepper motor from ETA movement may be used, since Lavet stepper motor may generate sufficient torque at sufficient speed to wind the mainspring. Further, as it may be understood from the different FIGS. 7A-9B, said at least one primary duration 125 may end when said primary power supply 110 may go below said first voltage threshold 511.

It may be shown that a Lavet stepper motor, where the minute axis typically steps once every 20 seconds, may be driven at 128 Hz, for example, while generating at least 20

μNm on the minute axis, and consuming less than 500 μW. This frequency, referenced 128 and noted $V_{IV}$ in FIGS. 1A & 1B, is obtained by diverting said secondary power supply 120 to a crystal.

Figure 6:
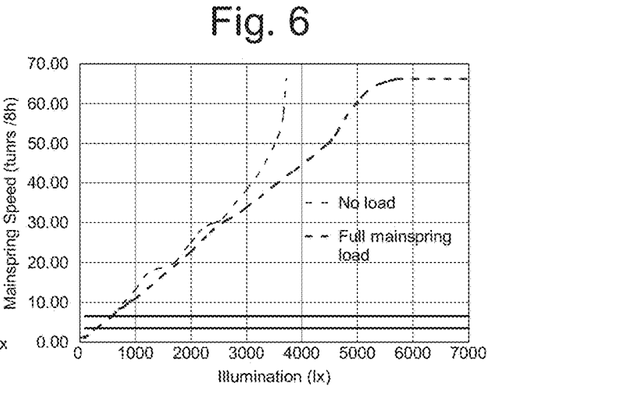

In this example, the Lavet motor is spinning at 2×128 Hz, i.e. 256 Hz, the winding mass gear turns at 0.35 Hz or once every 2.8 seconds, as it may be observed in FIG. 6. At this speed, the mainspring is fully wound in 1*h* 24 minutes, and the electrical power requirement of 500 μW may be provided by at least one solar cell 112. This level of electrical power is available for illumination exceeding 5 klx. Hence, at 700 lx in pulsed modes the winding time will increase from 1.4 hours to 10 hours, for a movement with an autonomy of over 80 h.

As aforementioned, said at least one energy supplier 111 may be partially charged or discharged when said primary power supply 110 reaches said second voltage threshold 512, preferably said at least one capacitor 113 is partially charged or discharged when said primary power supply 110 reaches said second voltage threshold 512. If the voltage on the capacitance reaches or exceeds said second voltage threshold 512 depending on the input power and load, e.g. 2.2 V, the output of the secondary power supply 120 may jump to the third voltage threshold 513 1.8 V for example, and the output will remain at 1.8 V when the capacitance voltage exceeds 1.8 V, or follow the capacitance voltage between 1.8 V and 1.7 V (first voltage threshold 511), such as said at least one capacitor 113 may be charged and then may supply the motor only when sufficient voltage is available to generate a useful torque. Said secondary power supply 120 may be comprised between 1.7 V to 1.8 V, a illustrated in figures. At this point, said secondary power supply 120 may not be the same as the voltage on said at least one capacitor 113, if the voltage on said at least one capacitor 113 exceeds 1.8 V. Before the voltage on said at least one capacitor 113 reaches 2.2 V (second voltage threshold 512) the voltage on said secondary power supply 120 is near 0 V or 0 V.

Figure 7A:
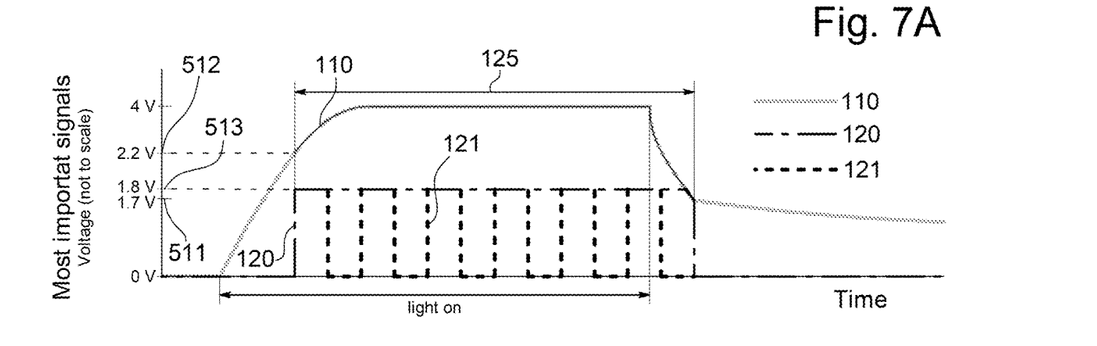
Figure 7B:
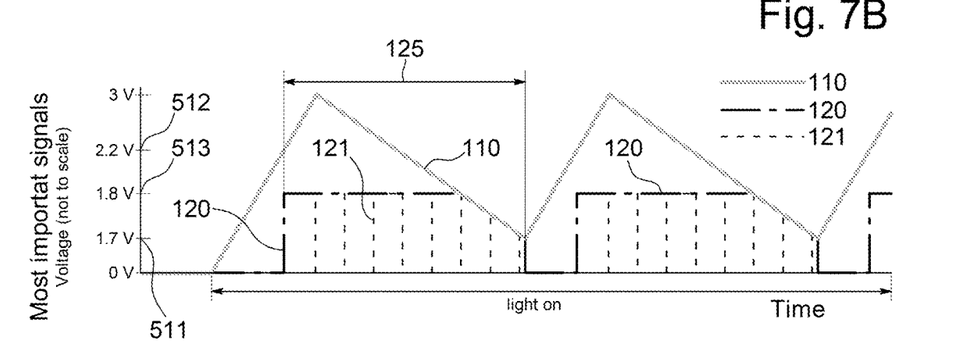
Figure 8A:
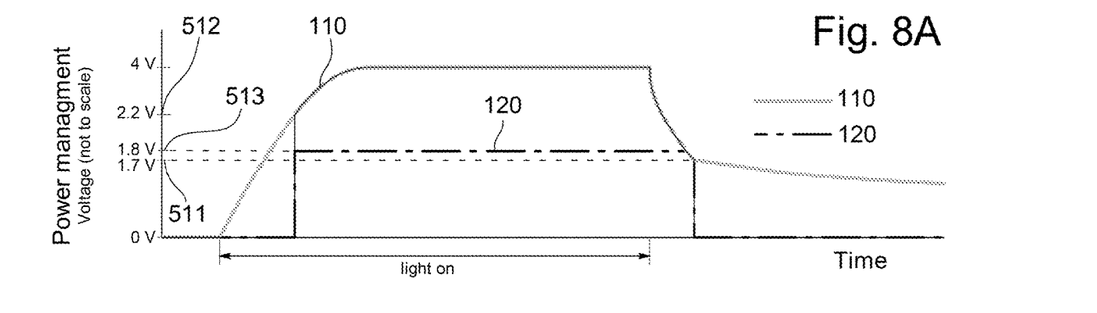
Figure 8B:
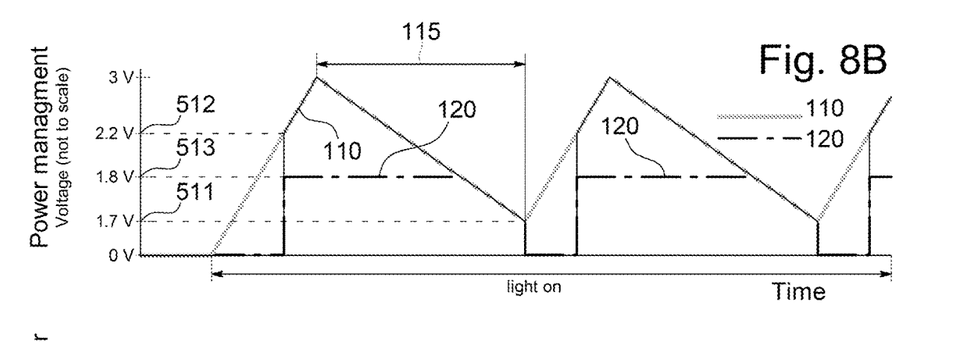
Figure 9A:
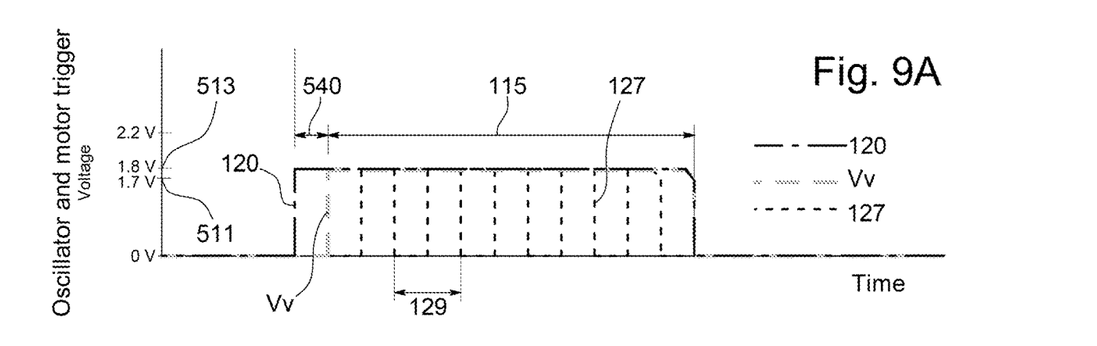
Figure 9B:
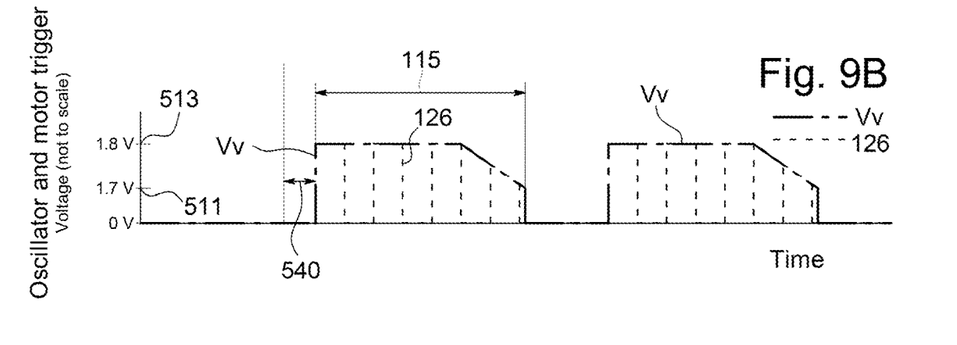
Figure 10A:
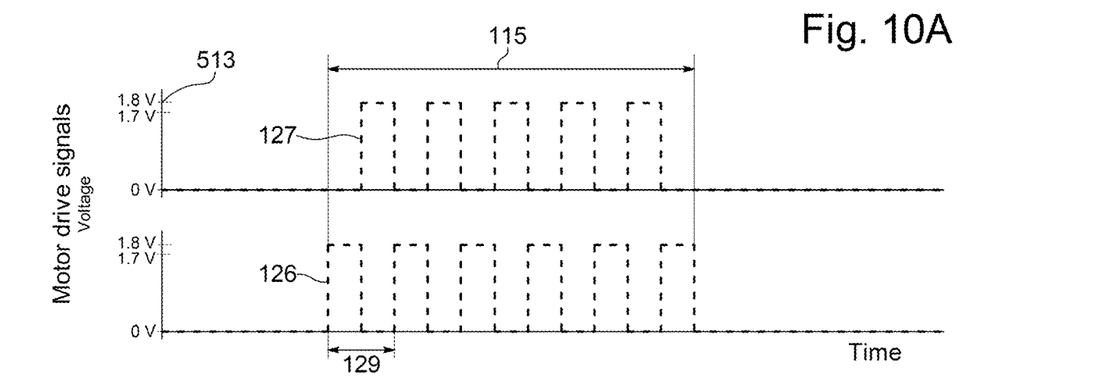
Figure 10B:
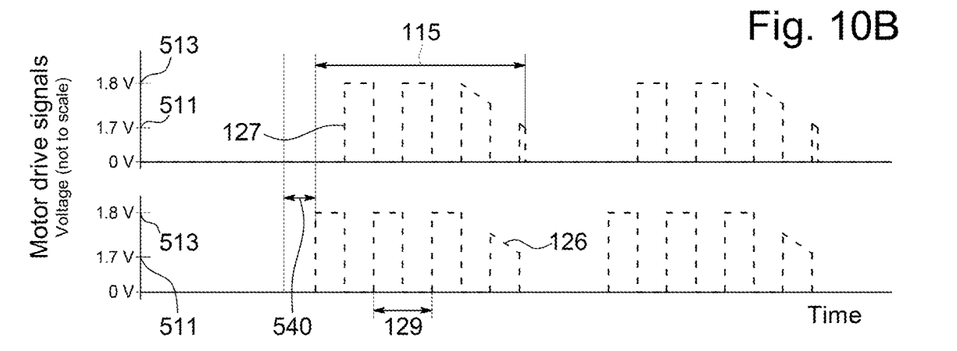

After reaching said second voltage threshold 512, said motor 180 may be supplied 550 and may wind 570 a mainspring 190. In order to supply said motor 180, said secondary power supply 120 may be chopped into a modulated signal having at least one secondary duration 129 determined to maximize the motor's efficiency and being at least ten time shorter than said primary duration 125, as shown in FIG. 7, and being transformed into a first secondary square wave 126 and a second secondary square wave 127 equal to said modulated signal, such as the energy available is transformed into at least one waveform that can efficiently drive a motor. Moreover, said first secondary square wave 126 and said second secondary square wave 127 may be inversed with respect to each other, as illustrated in FIG. 8, thanks two NOT-gates, for example, which flip the voltage applied over said motor 180. A D-Flip-Flop ensures the NOT-gates are only active once both the desired potential is available and the oscillator output is ON, said D-Flip-Flop may be supplied with said secondary power supply 120 as noted $V_V$ in FIGS. 1A, PB, 7A, 9A 7B, and 9B. Indeed, after being chopped, said secondary power supply 120 may be delayed 540 before supplying 550 said motor 180 such as to prevent loss of efficiency by insuring that the chopped signal is established before energy is supplied to the motor. The said waveforms described as first secondary and second secondary square waves can also be different waveforms, for example, but not limited to, bi-polar square waves or square waves with duty cycles smaller than 50% such that a pause between impulses of said first secondary square wave 126 and said second secondary square wave 127 occurs. The most efficient waveform will be dependent on the type of motor or stepper motor used. Further, as it may be understood from the different FIGS. 7A-9B, the duration 115 of the first and second secondary square waves may start after said delay 540 and may last as long as said primary power supply 110 may be above said first voltage threshold 511, as illustrated in FIGS. 8A-9B.

A stop of converting 530 said primary power supply 110 into said secondary power supply 120 may occur when said primary power supply 110 reaches said first voltage threshold 511, preferably when said primary power supply 110 is lower than said first voltage threshold 511, so when said at least one capacitor 113 voltage reaches or drops below said first voltage threshold 511, e.g. 1.7 V, the output of the power module switches off, so the stored power is isolated from the motor if insufficient voltage remains for efficient operation.

Another embodiment may use a microcontroller to act as the power management and the drive signal generator. This has the advantage that it can adapt to the circumstances. By turning the motor at an ideal speed, the charge of the capacitor can be maintained at an optimum level where the solar cells are most efficient. Possibly more important is that feedback can be added to determine if the motor has advanced or not. This is important, as it would allow the electronics to know if high or low torque needs to be applied. The implementation described above is engineered to generate as much torque as possible to ensure a full charge of the mainspring is possible. To do this 70 μNm must be reached or 15 μNm on the minute hand. When the mainspring is emptied, this requirement may drop by a factor three. Hence, one could consider a system which initially winds with low torque, senses when this is insufficient, and then increases the bias voltage or pulse duration to ensure full and optimal winding of the mainspring. It is estimated that a factor of 2 may be gained in efficiency in comparison to the fixed torque example given.

The invention claimed is:

1. A power management method for a solar watch or a solar automatic watch; said power management method comprising:
   providing a primary power supply from at least one energy supplier;
   converting said primary power supply to a secondary power supply when said primary power supply having alternatively OFF periods and ON periods, each ON period starting when said primary power supply reaches a second voltage threshold and ending when this primary power supply then becomes a first voltage threshold lower than the second voltage threshold, the secondary power supply in each ON period being regulated so that its supply voltage remains at a third voltage threshold, higher than the first voltage threshold and lower than the second voltage threshold, when the voltage of the primary power supply exceeds said third voltage threshold;
   supplying a motor with said secondary power supply during at least a part of each ON period by chopping the supply voltage into at least a periodic modulated signal which is provided by the secondary power supply; and
   winding a mainspring via said motor.

2. The power management method according to claim 1, wherein said at least one energy supplier comprises at least one solar cell and/or at least one capacitor.

3. The power management method according to claim 1, wherein the solar watch comprises a delaying circuit configured to delay in supplying said motor with said secondary power supply.

4. The power management method according to claim 1, wherein the secondary power supply provides a first periodic modulated signal and a second periodic modulated signal which are inversed relative to each other and respectively provided to two supply terminals of the motor.

5. The power management method according to claim 4, wherein a primary duration of each ON period of the secondary power supply is at least ten times longer than a secondary duration defined by the period of the first and second periodic modulated signals.

6. The power management method according to claim 5, wherein said secondary duration is determined to maximize an efficiency of the motor.

\* \* \* \* \*